United States Patent
Kojima et al.

(10) Patent No.: US 9,621,275 B2
(45) Date of Patent: Apr. 11, 2017

(54) METHOD FOR GENERATING CONSTANT MODULUS MULTI-DIMENSIONAL MODULATIONS FOR COHERENT OPTICAL COMMUNICATIONS

(71) Applicant: Mitsubishi Electric Research Laboratories, Inc., Cambridge, MA (US)

(72) Inventors: Keisuke Kojima, Weston, MA (US); David Millar, Somerville, MA (US); Toshiaki Koike-Akino, Malden, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 346 days.

(21) Appl. No.: 14/320,766

(22) Filed: Jul. 1, 2014

(65) Prior Publication Data

US 2016/0006515 A1    Jan. 7, 2016

(51) Int. Cl.
*H04B 10/04*    (2006.01)
*H04B 10/508*    (2013.01)
(Continued)

(52) U.S. Cl.
CPC ....... *H04B 10/508* (2013.01); *H04B 10/5161* (2013.01); *H04L 27/34* (2013.01)

(58) Field of Classification Search
CPC  H04B 10/508; H04B 10/5161; H04B 14/004; H04B 14/008; H04B 10/516;
(Continued)

(56) References Cited

U.S. PATENT DOCUMENTS 5,388,124 A * 2/1995 Laroia ............... H04L 25/03343
375/265
7,340,001 B2 * 3/2008 Smith .................. H04B 14/004
342/361
(Continued)

OTHER PUBLICATIONS

Millar et al. "A 24-Dimensional Modulation Format Achieving 6 dB Asymptotic Power Efficiency," Advanced Photonics 2013—Signal Processing in Photonic Communications, SPPCOM 2013, Jul. 14, 2013, p. SPM3D.6, XP055138791, Washington DC, DOI 10.1364/SPPCOM.2013.SPM3D.6 ISBN: 978-1-55-752981-7.
(Continued)

*Primary Examiner* — Hibret Woldekidan
(74) *Attorney, Agent, or Firm* — Gene Vinokur; James McAleenan; Hironori Tsukamoto (57) ABSTRACT

A method generates constant modulus multi-dimensional modulations for coherent optical communications by first projecting points in a constellation of the code onto a Poincare sphere or its higher-dimensional hyper-sphere. By using meta-heuristic procedures, nonlinear programming and gradient search methods, constellation points in the hyper-sphere are optimized in certain criteria, such as maximizing the minimum Euclidean distance, minimizing the union bound, minimizing the bit-error rate, minimizing the required signal-to-noise ratio, maximizing the nonlinear fiber reach, maximizing the phase noise tolerance, and maximizing the mutual information. Some methods use parametric unitary space-time block codes such as Grassmannian packing, and filter impulse response as well as unitary rotation over adjacent code blocks to generate near-constant modulus waveform, not only at the symbol timing, but also over the entire time.

14 Claims, 12 Drawing Sheets

(51) Int. Cl.
*H04B 10/516* (2013.01)
*H04L 27/34* (2006.01)

(58) Field of Classification Search
CPC ... H04B 10/5055; H04B 10/532; H04L 27/00; H04L 27/34; H04L 1/0009; H03M 13/1102; H03M 13/258; H04J 14/06
USPC .. 398/25, 183, 186, 188, 192, 193, 184, 205
See application file for complete search history.

(56) References Cited

U.S. PATENT DOCUMENTS

| | | | | |
|---|---|---|---|---|
| 8,418,018 | B2* | 4/2013 | Pons | H04L 1/0041 375/261 |
| 8,433,205 | B2* | 4/2013 | Koike-Akino | H04B 10/5055 398/148 |
| 8,982,986 | B2* | 3/2015 | Boutros | H03M 13/1102 370/252 |
| 9,088,447 | B1* | 7/2015 | Koike-Akino | H04L 25/03006 |
| 9,112,653 | B2* | 8/2015 | Koike-Akino | H03M 13/251 |
| 9,143,238 | B2* | 9/2015 | Roberts | H04B 10/532 |
| 9,264,118 | B1* | 2/2016 | Koike-Akino | H04L 1/0612 |
| 2002/0122507 | A1* | 9/2002 | Eidson | H04L 27/3818 375/340 |
| 2015/0195045 | A1* | 7/2015 | Zhuge | H04B 10/532 398/184 |

OTHER PUBLICATIONS

Karlsson et al., "Which is the most power efficient modulation format in optical links?" Optics Express, vol. 17, No. 13, Jun. 22, 2009, p. 10814, CP055006998, ISSN: 1094-4087, DOI 10.1364/OE.17.010814.
Hochwald et al. "Differential Unitary Space-Time Modulation," IEEE Transactions on Communications, vol. 48, No. 12, Dec. 2000. p. 2041-2052.
Walter et al. "Cross-Polarization Modulation in Polarization-Division Multiplexed Transmission Systems," MA2.1 Invited 10.30-11. 00. 978-1-4244-3731—Mar. 10, 2010. IEEE.
Winzer et al. "Penalties from In-Band Crosstalk for Advanced Optical Modulation Formats," ECOC Technical Digest. 2011 OSA.
Buchali et al. "Experimental Transmission with POLQAM and PS-QPSK Modulation Format Using a 28 Gbaud 4-D Transmitter," ECOC Technical Digest. 2012 OSA.
Buelow et al. "Experimenatl Performance of 4D Optimized Constellation Alternatives for PM-8QAM and PM-16QAM," OFC 2014. OSA.
Millar et al. "Comparison of Quaternary Block-Coding and Sphere-Cutting for High-Dimensional Modulation," OFC 2014. OSA.
Hochwald et al. "Systematic Design of Unitary Space-Time Constellations," IEEE Transactions on Information Theory. vol. 46, No. 6. Sep. 2000.
Bulow Henning et al: "Coded modulation of polarization- and space-multiplexed signals"; Optical Transmission Systems, Subsystems, and Technologies IX, SPIE, 1000 20th St. Bellingham WA 98225-6705 USA, vol. 8309, No. 1, Dec. 28, 2011 (Dec. 28, 2011) pp. 1-10, XP060024785, DOI: 10.1117/12.900442 [retrieved on Jan. 1, 1901] abstract Sections 1. and 4. figure 8.
Leonardo Coelho et al: "Global Optimization of Fiber-Optic Communication Systems using Four-Dimensional Modulation Formats", 37th European Conference and Exposition on Optical Communications, Sep. 22, 2011 (Sep. 22, 2011), p. Mo.2.B.4, XP055137329, Washington, D.C. DOI: 10.1364/ECOC.2011.Mo.2.B.4 ISBN: 978-1-55-752931-2 1. Introduction.
Renaudier et al: "Generation and Detection of 28 Gbaud Polarization Switched-QPSK in WDM Long-Haul Transmission Systems", Journal of Lightwave Technology, IEEE Service Center, New York, NY, US, vol. 30, No. 9, May 1, 2012 (May 1, 2012), pp. 1312-1318, XP011440069, ISSN: 0733-8724, DOI: 10.1109/JLT.2012.2185682 abstract Sections 1. to 3.
Kojima Keisuke et al: "Constant modulus 4D optimized constellation alternative for DP-8QAM", 2014 The European Conference on Optical Communication (ECOC), Systematic Paris Region Systems and ICT Cluster, Sep. 21, 2014 (Sep. 21, 2014), pp. 1-3, XP032689412, DOI: 10.1109/ECOC.2014.6964188 [retrieved on Nov. 20, 2014] the whole document.

* cited by examiner

METHOD FOR GENERATING CONSTANT MODULUS MULTI-DIMENSIONAL MODULATIONS FOR COHERENT OPTICAL COMMUNICATIONS

FIELD OF THE INVENTION

This invention relates generally to coherent optical communications, and more particularly to generating constant modulus modulations for coherent optical communications.

BACKGROUND OF THE INVENTION

As the requirement for data rate for optical communications increases, newer coded modulations are required to achieve low bit-error rate (BER), to increase data rates, fiber distance, and spectral density. For optical communications, as the data rate increases, more complicated quadrature-amplitude modulation (QAM) formats, such as 8QAM, 16QAM, 64QAM, 256QAM, 1024QAM, etc., are generated. These modulations typically have varying signal power depending on the symbols, and can cause phase noise on the signal a channel as well as other wavelength-division multiplexed channels. While phase-shift keying (PSK) modulation formats have constant modulus at each symbol timing, the BER performance can seriously degrade compared to QAM because of the shorter constellation distance.

For example, 8-ary QAM (8QAM) plays an important role by filling the gap between quaternary PSK (QPSK) and 16QAM in terms of bit rates and fiber distance. It has also been proposed that hybrid QAMs such as 8QAM-16QAM or QPSK-8QAM used in time-domain.

In order to achieve similar bit rates with improved sensitivity, quaternary codes, spherical lattice-cut codes, and 4D honeycomb lattice codes can be used. However, for these 6 bits/symbol codes, achieving high sensitivity, Gray coding, and constant modulus at the same time has not been realized.

In WO 2009/124861 "Modulation scheme with increased number of states of polarizations," the number of states of polarization is increased using a Stokes space as a guide. However, how the states of polarization can be optimized using the existing sets of polarizations is not described.

Pi/4-shift QPSK modulation achieves lower power envelope fluctuation during symbol transition, and generates a reasonably constant modulus waveform. Minimum shift keying (MSK) and frequency-shift keying (FSK) can generate perfectly constant modulus waveforms even in-between symbol transitions. However, there is no MSK/FSK achieving high data rates because the increased number of cardinalities expands the required bandwidth. And, it does not exploit 4D optical carrier fields. Trellis shaping is known as another method of generating constant modulus signals. However, this technique requires additional overhead and complexity for trellis coding.

SUMMARY OF THE INVENTION

Some embodiments of the invention provide a method for generating a constant modulus 4D code for coherent optical communications. Specifically, in some embodiments, the method uses a four-dimensional 2-ary amplitude 8-ary phase-shift keying (4D-2A8PSK) code.

The code is derived, for example, from a dual-polarization 8PSK (DP-8PSK) code, which involves the polarization multiplexing of two different QPSK signals, thus improving the spectral efficiency by a factor of two, and has the properties of constant modulus and Gray coding.

Let x and y be the x- and y-polarization components of the input symbols of the code. Its Stokes vector S can be expressed as $$S = \begin{bmatrix} s_0 \\ s_1 \\ s_2 \\ s_3 \end{bmatrix} = \begin{bmatrix} xx^* + yy^* \\ xx^* - yy^* \\ x^*y + xy^* \\ -jx^*y + jxy^* \end{bmatrix}$$

where * denotes the complex conjugate. The vector can be projected into a Stokes space, which parameterizes the last three parameters of a Stokes vector in Cartesian coordinates, as constellation points, also called states of polarization. If the code is constant modulus, then the constellation points are projected onto a Poincare sphere. The neighboring points on a Poincare sphere usually correspond to the nearest neighbors in 4D space depending on the absolute phase. Then, we move the constellation points on the Poincare sphere to increase the Euclidean distance among nearest neighbor points, while maintaining a constant modulus. Therefore, this gives larger Euclidean distances. Transmission simulation results show that our code, 4D-2A8PSK, has at least 1 dB better nonlinear performance than DP-8QAM.

Other embodiments use arbitrary combinations of QAMs/APSKs for dual polarizations, such that the characteristics of constant modulus in 4D optical fields hold by normalizing the total power for each codeword. Specifically, any data rates are possible with M-ary amplitude and N-ary phase shift keying (MANPSK), where M and N are positive integers.

Some embodiments of the invention provide optimized constellation points, which do not rely on regular QAM/APSK constellations. Numerical optimization based on meta-heuristic procedures and gradient search methods finds the best constant modulus constellations. The metrics of optimizations include maximizing the minimum Euclidean distance, minimizing the union bound, minimizing the BER, maximizing the nonlinear fiber reach, maximizing the mutual information, and minimizing the power-envelope variance during the signal transition.

Some embodiments of the invention provide a method for generating constant modulus higher-dimensional modulations, using spatial domain and/or time domain. In one embodiment, constant-modulus higher-dimensional modulations can be designed from a subspace of unitary space-time block codes. In another embodiment, any L-dimensional modulations can be designed by higher-dimensional spherical space in the Stiefel manifold for L-by-1 vector through the use of exponential map, or Cayley transform of skew-symmetry matrix with L−1 degrees of freedom.

Another embodiment uses an impulse response of a transmit filter to generate near-constant modulus waveform signals even in-between of the symbol timings over the several symbols in block code. To reduce the envelope variation, a 4×4 unitary matrix with 6 degrees of freedom can be applied as an extension of phase-shift PSK to higher-dimensional modulations. This near-constant modulus property improves the nonlinearity tolerance for fiber-optic communications.

DETAILED DESCRIPTION OF THE EMBODIMENTS

4D-2A8PSK for DP-8QAM Alternative

The embodiments of the invention provide a method for generating a constant modulus 4D code for coherent optical communications. Specifically, the method uses a four-dimensional 2-ary amplitude 8-ary phase-shift keying (4D-2A8PSK) code, alternative, to DP-8QAM as an example. It should be understood that the method can be applied to other codes, such as 16QAM-alternative.

Figure 1A:
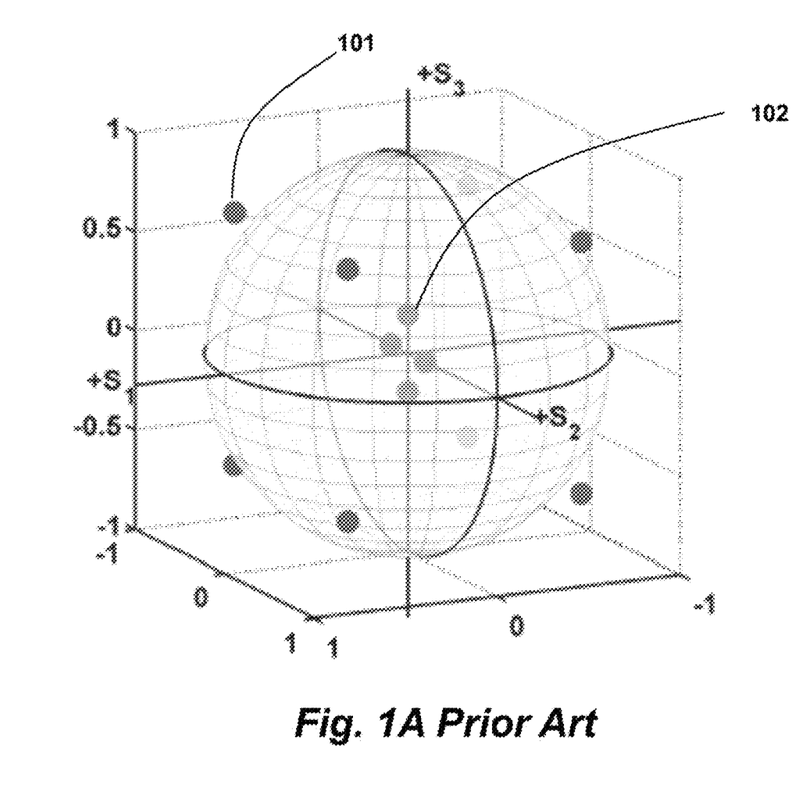
FIG. 1A is a schematic for prior art constellations in Stokes space for DP-8QAM.

We start with the constellation points projected onto the Stokes space. FIG. 1A shows the DP-8QAM constellation points in the Stokes space, the normalized spherical coordinates of the three-dimensional vector of Cartesian coordinates are known in the art as $S_1$, $S_2$, and $S_3$.

A radius r to each point represents a signal power or intensity. Because the projection is not constant modulus, the radius of each point, e.g. points 101 and 102, differs significantly, and this affects a nonlinear performance.

Figure 1B:
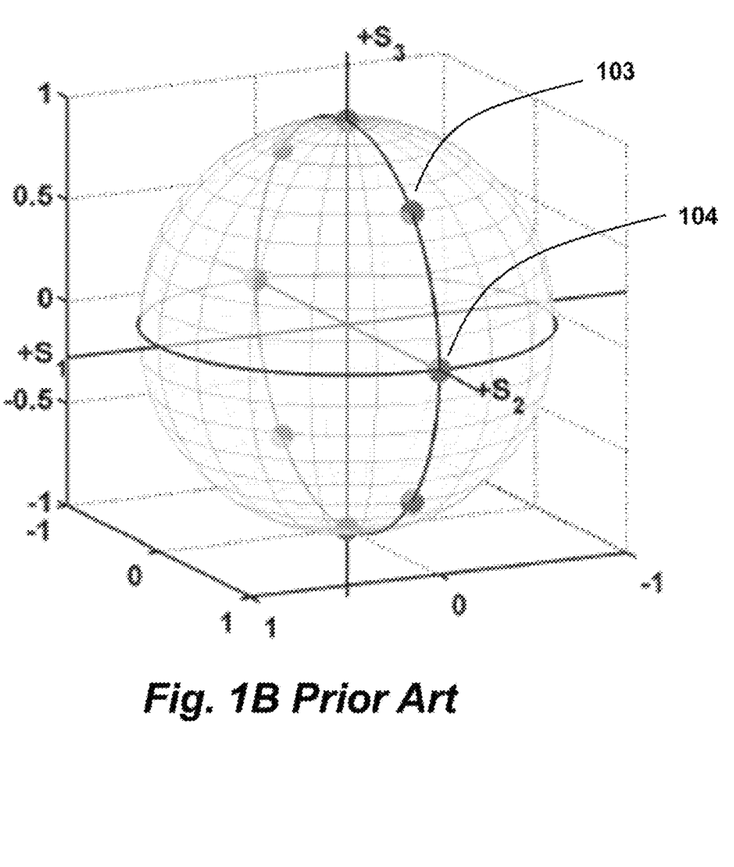
FIG. 1B is a schematic for prior art constellations in Stokes space for DP-8PSK.

FIG. 1B shows the dual-polarization 8-ary phase-shift keying (DP-8PSK), where each projected point represents 8 words of 6 bits, which are actually separated well in 4D space. However, nearest words in the 4D space correspond to the nearest points 103 and 104 in FIG. 1B. Therefore, the DP-8PSK has poor noise tolerance.

Figure 1C:
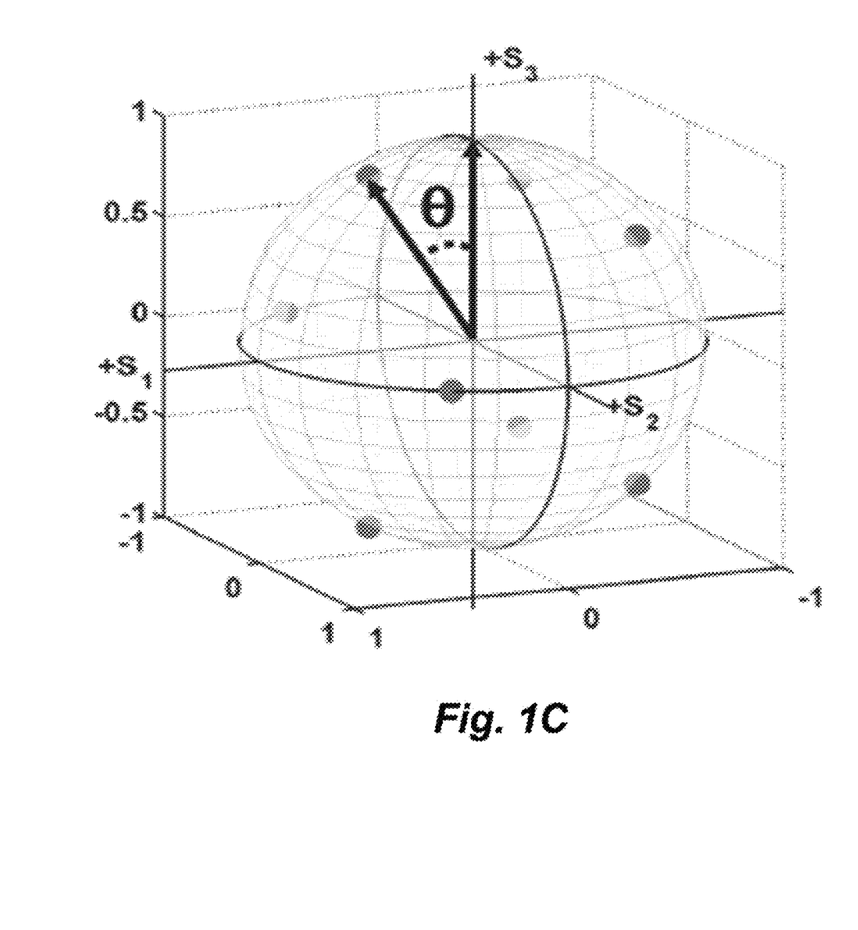
FIG. 1C is a schematic for constellations in Stokes spare for 4D-2A8PSK according to embodiments of the invention.

FIG. 1C shows a 3D Stokes-space constellation according to embodiments of the invention. As used herein, the constellation represents the signal modulated by a digital modulation format, such as QAM or PSK. The constellation represents the possible symbols that may be selected by a given modulation format.

In order to increase the nearest points in the Stokes space, we use a constellation configuration where the 8 constellation points are staggered and separated into two groups.

One realization of constant modulus modulations according to the embodiments of the invention is based on 4-dimensional 2-ary amplitude 8-ary phase-shift keying (4D-2A8PSK) code, which can be expressed as $$x(k,l)=a(l)e^{j\phi_k}, y(k,l)=b(k,l)e^{j\phi_l}$$

k=1, . . . , 8, l=1, . . . 8 where
$r_1=\sin(\theta+\pi/2)/\sqrt{2}$, $r_2=\cos(\theta+\pi/2)/\sqrt{2}$,
$a(l)=[r_1, r_2, r_1, r_2, r_1, r_2, r_1, r_2]$,
$b(k,l)=[r_2, r_1, r_2, r_1, r_2, r_1, r_2, r_1]$ (for k=1, 3, 5, 7),
$b(k,l)=[r_1, r_2, r_1, r_2, r_1, r_2, r_1, r_2]$ (for k=2, 4, 6, 8), and
$\phi_k=\pi/4\times(k-1)$.

A ratio of the two radii is $r_2/r_1=\tan^{-1}(\theta+\pi/2)$. Note that $r_2/r_1=1$ is a special case reducing to the DP-8PSK.

Figure 2A:
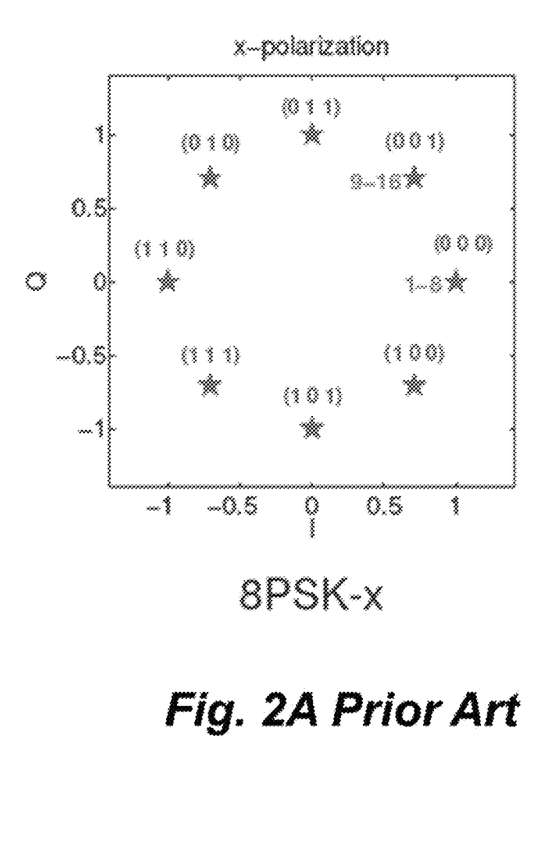
FIGS. 2A and 2B are schematics of prior art constellations for DP-8QM.
Figure 2B:
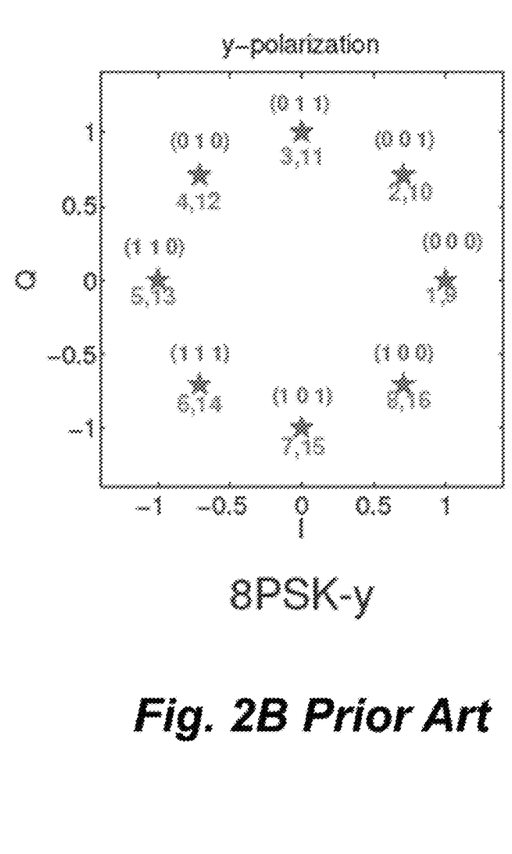

FIGS. 2A and 2B show the constellation for DP-8PSK for x- and y-polarizations respectively, where bit triplets (0 1 0) etc. represent half of the bits of the code word, and integers, e.g., 1, 2, . . . , 16, represent the constellation points corresponding to the x- and y-polarizations.

Figure 2C:
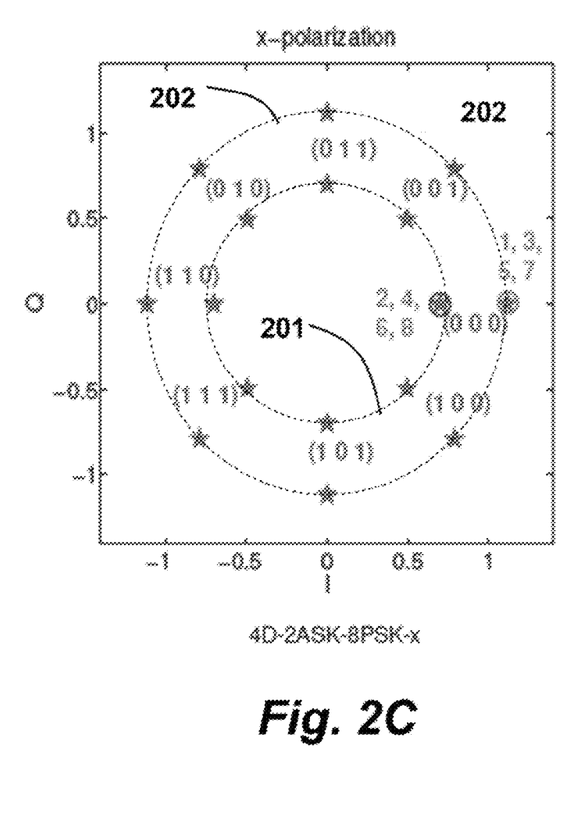
FIGS. 2C and 2D are schematics of constellations for 4D-2A8PSK according to embodiments of the invention.
Figure 2D:
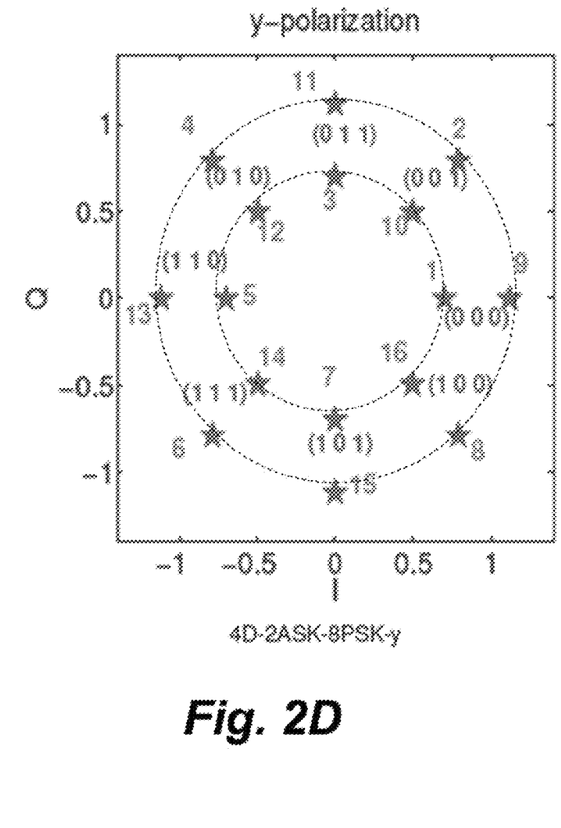
Figure 3A:
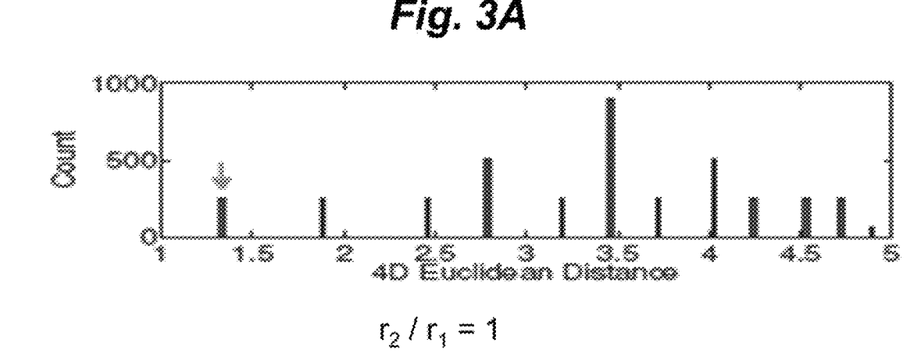
FIGS. 3A, 3B, 3C and 3D are graphs of counts as a function for shortest distances for $r_2/r_1=1$, 0.8, 0.6, and 0.5858, respectively.
Figure 3B:
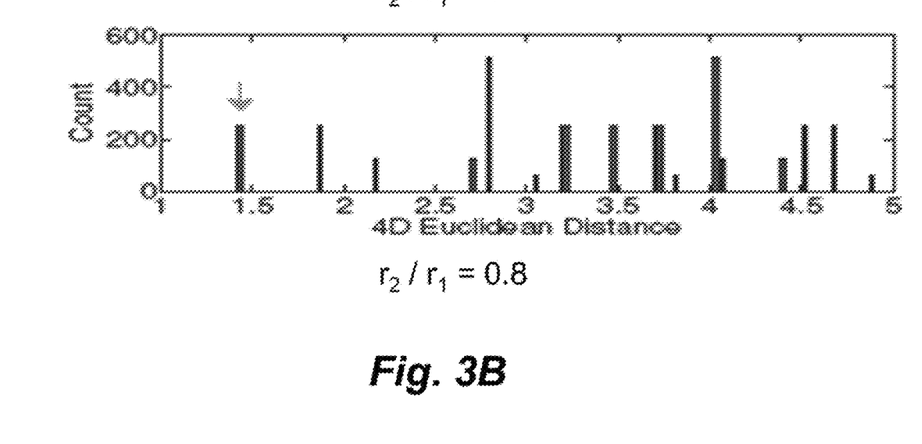
Figure 3C:
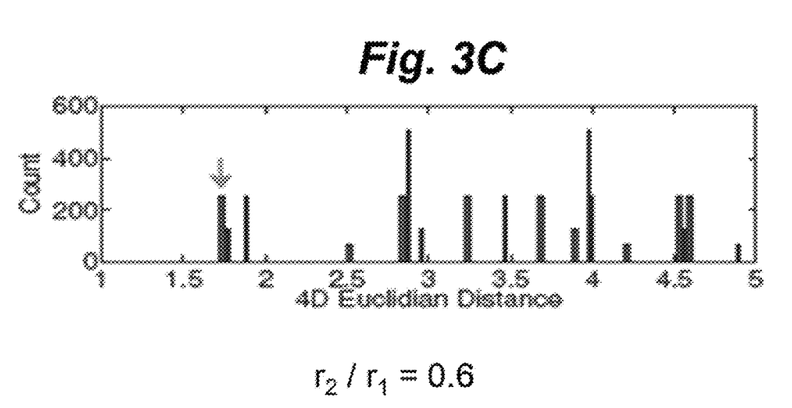
Figure 3D:
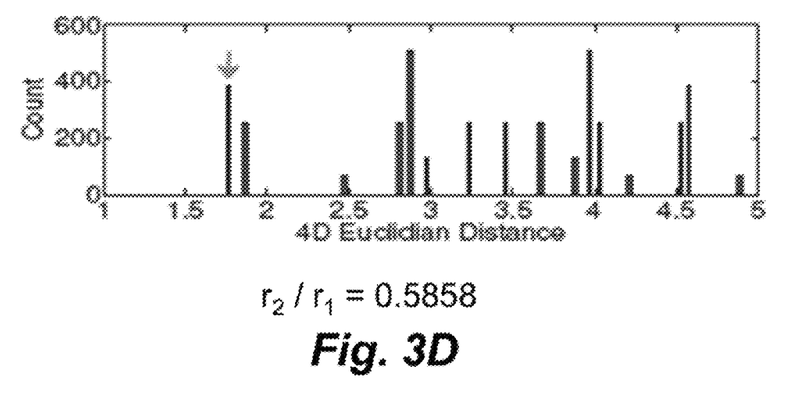

FIGS. 2C and 2D show the constellation for 4D-2A8PSK for x- and y-polarizations. Because θ deviates from 0, two rings 201 and 202 become separated.

As shown in FIGS. 3A, 3B, 3C, and 3D, in order to understand the behavior of nearest neighbors, we plot a histogram of 4D Euclidean distances of all the constellation points as a function of the radii $r_2/r_1$. Starting with $r_2/r_1=1$ (for DP-8PSK), the count for the shortest distance combination remains the same until $r_2/r_1$ reaches 0.5858, and this means that the Gray coding works well between $r_2/r_1=0.5858$ and 1.

Figure 4:
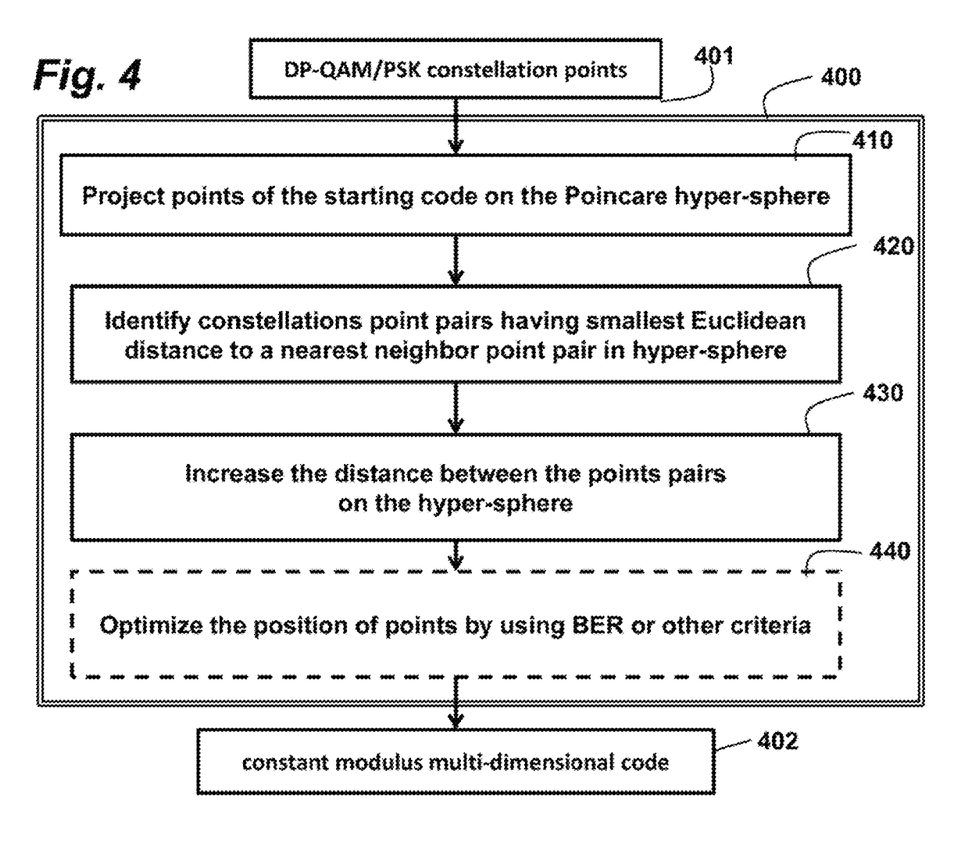
FIG. 4 is a flow diagram of a method for generating constant modulus multi-dimensional codes for coherent optical communications according to embodiments of the invention.

FIG. 4 shows the method for generating constant modulus 4D code 402 for a code 401 used in optical communications according to embodiments of the invention. We select one of DP-QAMs/PSKs as the starting point of the code as shown in FIG. 1B in an example embodiment of DP-8PSK. The constellation points 401 are projected 410 onto the Poincare sphere or higher-dimensional version of hyper-sphere. In this example embodiment, a Gray code is used for labeling.

We identify 420 point pairs in the constellation having smallest Euclidean distances to a nearest neighbor point pairs in multi-dimensional space.

As shown in FIG. 1C, we increase 430 the distances between the identified point pairs on the Poincare sphere. In the 4D-2A8PSK case, this means that we change $r_2/r_1$ starting from 1. During this process as shown in FIGS. 3A, 3B, 3C and 3D, the Gray code property is maintained until the points are moved far from the original points, $r_2/r_1=0.5858$. Also, by ensuring that the point pairs are not on the same circle perpendicular to the $S_1$ axis, the tolerance to phase noise is maximized. Phase noise caused by fiber nonlinearity moves the points along the $S_1$ axis.

We can also optimize 440 the positions of points using various performance criterion, e.g., a bit-error rate (BER) under an additive white Gaussian noise is increased, or other criteria including Euclidean distance, phase noise tolerance, required signal-to-noise ratio, mutual information, nonlinear performance, and variance of signal transition. The optimum value of $r_2/r_1$ can be selected using any certain criterion.

Figure 5:
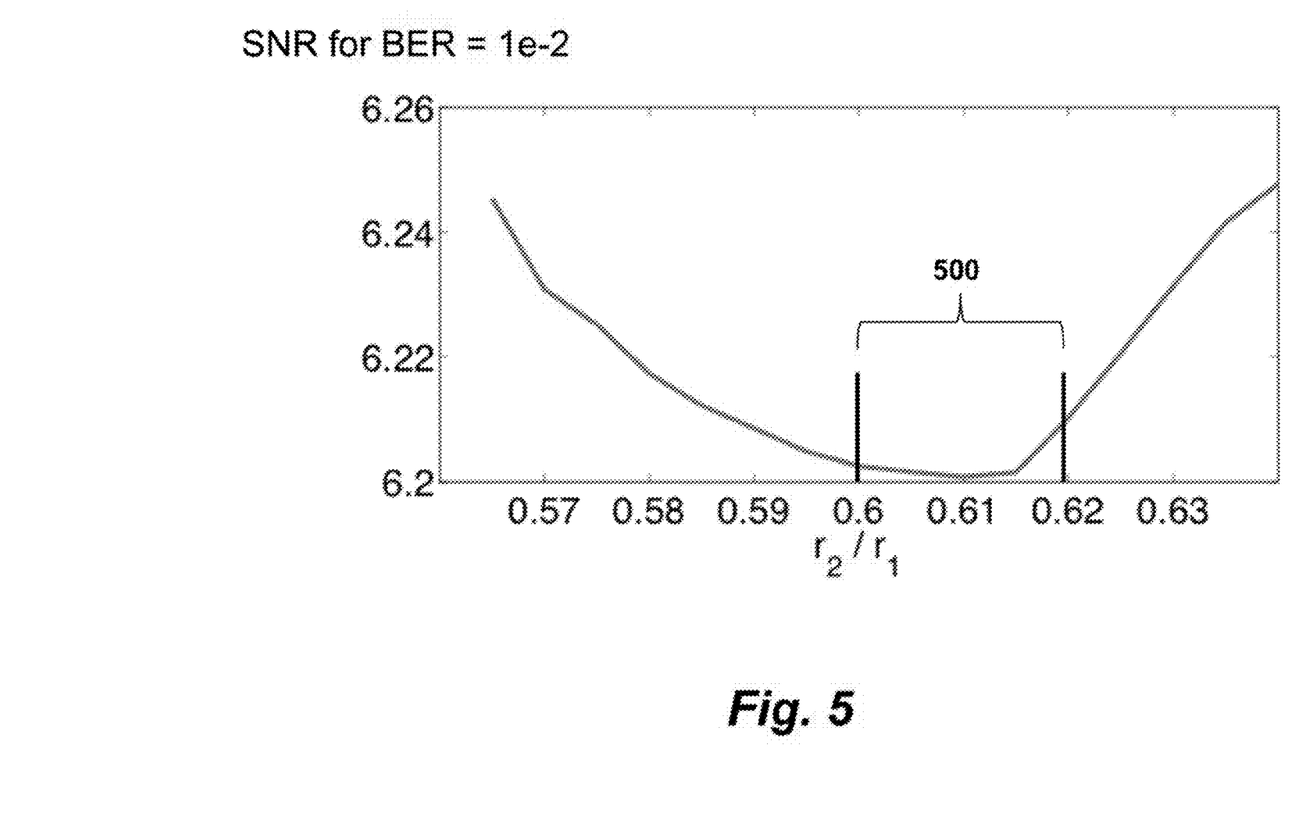
FIG. 5 is a graph showing the required signal-to-noise ratio for BER $10^{-2}$, as a function of $r_2/r_1$.

For example, FIG. 5 shows the required signal-to-noise ratio for BER=$10^{-2}$, as a function of $r_2/r_1$. For the performance criterion of the required signal-to-noise ratio, we can select a value 500 around 0.6-0.62, when the main interest of operation is around BER=$10^{-2}$. Alternatively, we can use optical fiber transmission results at high input power, and the optimum value can be obtained by looking at the minimum signal-to-noise ratio at a certain BER. In another criterion, the mutual information calculated from the histogram of bit log-likelihood ratio can be used for designing the best constant modulus modulation and the best error correction code at the same time.

The steps of the method can be performed offline or online in a processor 400 connected to memory and input/output interfaces by buses as known in the art.

Figure 6:
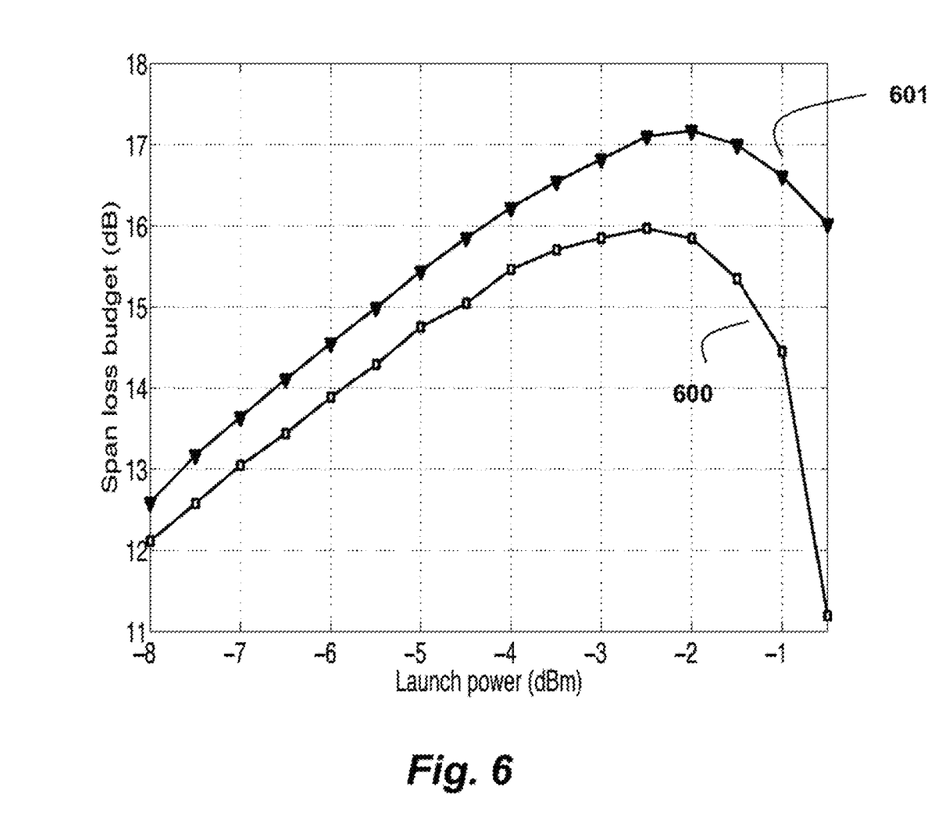
FIG. 6 is a simulated span loss budget (a measure of transmitted signal quality, wherein higher number is better)

FIG. 6 shows the span loss budget (how much loss is allowed for the span, which is a measure of signal quality), wherein larger number is better. The lower performance curve 600 is for DP-8QAM, and the higher performance curse 601 is for 4D-2A8PSK. The constant modulus 4D-2A8PSK coding, compared to DP-8QAM, has 0.6 dB better sensitivity in linear region, i.e., where a launch power is small, which is partially attributed to the Gray coding property. Moreover, it has greater than 1 dB sensitivity in nonlinear region, where launch power is high (>−2 dBm). This is because to the constant modulus property, where nonlinear interference to other channels are smaller than the conventional non-constant modulus DP-8QAM code.

MANPSK for Other Data Rates

Some embodiments use any arbitrary combinations of regular amplitude-phase shift keying (APSK), QAM, and/or circular QAM.

Figure 7:
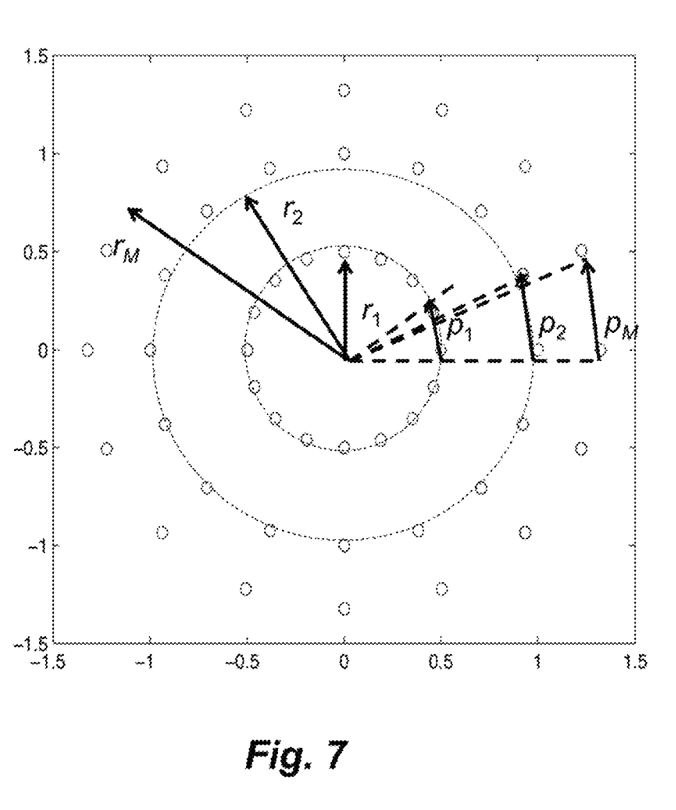
FIG. 7 is a schematic of constellations for phase-offset M amplitude N (MAN)PSK, where M and N are positive integers, according to embodiments of the invention.

As shown in FIG. 7, MANPSK can be generalized by any amplitude $r_1, r_2, \ldots, r_M$ and any phase offset $p_1, p_2, \ldots, p_M$ for each N-ary PSK and M rings, where N and M are positive integers. To realize constant modulus, the amplitudes A of x- and y-polarizations are chosen such that the sum at the powers are restricted to be constant for all code words. The amplitude and phase offset parameters are optimized in certain criterion, such as Euclidean distance, BER, mutual information, and so on. The constellation at x-polarization is not required to be the same constellation at y-polarization.

For DP-BPSK alternative, 2A2PSK, . . . , 4A4PSK can be used for each x- and y-polarizations. For DP-QPSK alternative, 2A4PSK, 4A4PSK, . . . , 16A16PSK can be used for constant modulus 4D modulations. For DP-16QAM alternative, 2A16PSK, 4A16PSK, . . . , 64A64PSK can be used for constant modulus 4D modulations.

Some embodiments use a subspace of unitary space-time block codes (STBC) to generate constant modulus modulations based on the Stiefel manifold. Various ways to generate unitary STBC can be used, for example discrete Fourier transform, exponential mapping, Cayley transform, Reed-Muller operator, and cyclic rotations. For 4D constant modulus codes using cyclic rotations, unitary block, codes are expressed as $$X_k = \begin{bmatrix} e^{j2\pi k/Q} & 0 \\ 0 & e^{j2\pi k_1 k/Q} \end{bmatrix} \begin{bmatrix} \cos(2\pi k_2 k/Q) & \sin(2\pi k_2 k/Q) \\ -\sin(2\pi k_2 k/Q) & \cos(2\pi k_2 k/Q) \end{bmatrix}$$
$$\begin{bmatrix} e^{j2\pi k_3 k/Q} & 0 \\ 0 & e^{-j2\pi k_3 k/Q} \end{bmatrix},$$

where the integer parameters $k_1, k_2, k_3$, and Q are optimized in some criteria (e.g., minimizing HER). Any subspace projection such as [1 0] or [0 1] can hold the constant modulus property for 4D constellation. With [0 1] projection, the resulting constellations are APSK with amplitudes characterized by sin and cos for x- and y-polarization, respectively. Gray code or optimal labeling can be used for codeword index k.

For DP-BPSK alternative, the best parameters are $k_1=0$, $k_2=1$, $k_3=3$, and Q=10 for the case of minimum Euclidean distance criterion. For DP-8QAM alternative, the best parameters are $k_1=0$, $k_2=2$, $k_3=11$, and Q=68 for the case of minimum Euclidean distance criterion. For DP-16QAM, the best parameters are $k_1=0$, $k_2=7$, $k_3=10$, and Q=257 for the case of minimum Euclidean distance criterion. Adding the phase offset can improve the performance.

4D modulation is natural for the use of optical communications because there exist four carrier fields, more specifically, XI (in-phase component of x-polarization), XQ (quadrature component of x-polarization), YI (in-phase component of x-polarization), and YQ (quadrature component of y-polarization).

Some embodiments of the invention provide its generalization to L dimensions, where an integer L is not necessarily 4. Higher dimensions for L>4 can apply for any physical domain including time domain, frequency domain, wavelength domain, mode domain, core domain, and so on for advanced optical communications including multiple cores in space-division multiplexing and super-channel techniques. To generate constant modulus high-dimensional modulations to any dimensions, a subspace of unitary space-time block codes based on Fourier basis, exponential mapping, Cayley transform, or the Stiefel manifold is used so that the sum of symbol powers become constant. Given a real-valued vector V of size L−1, the L-dimensional codeword is generated by exponential map as $$\exp\left(\begin{bmatrix} 0 & V^T \\ -V & O_{L-1} \end{bmatrix}\right) e_1$$

where exp( ) is a matrix exponential, O is a zeros matrix of size L−1 and $e_1$ is a unit vector whose element are all zeros but 1 at the first element. In another embodiment, any combinations of regular QAM/APSK are used by normalizing the power to be constant for all code words.

Other embodiments of the invention use irregular constellations rather than APSK QAM, or STBC. Constellation points for each codewords are adjusted by meta-heuristic optimization procedures such as evolutionary strategy and differential evolution. The optimizer iteratively searches for the best constant modulus modulations in terms of a certain metric such as Euclidean distance, BER, nonlinear fiber reach, and mutual information. In each iteration, the sum of signal power in multi-dimension space is normalized to be constant so that all the signal points are placed on a surface of a hyper-sphere. For DP-BPSK alternative, an optimized irregular 4D constant modulus modulation to achieve lowest union bound at 4.5 dB signal-to-noise ratio is given as codeword(0)=[0.894146, 0.610875, −0.261494, 0.962695],
codeword(1)=[0.795588, −0.671345, 0.438253, 0.910628].
codeword(2)=[−0.518059, 0.903509, 0.288242, −0.960133],
codeword(3)=[0.810572, −0890826, 0.210647, −0.933202], where union bound is calculated as $$p = \frac{1}{M} \sum_{i=1}^{M} \sum_{j=1}^{M} d_H(s_i, s_j) \frac{1}{2} \mathrm{erfc}\sqrt{\frac{d_E^2(s_i, s_j)}{4\sigma^2}}$$

where M is the modulation size per polarization, $d_H$ is the hamming distance and $d_E$ is the Euclidean distance between codeword $s_i$ and $s_j$ for noise variance $\sigma^2$. The minimum Euclidean distance criterion usually does not work well for low signal-to-noise ratio regimes around the Shannon limit. On the other hand, the criterion of union bound can deal with labeling optimization as well as Euclidean distance optimization. For DP-QPSK alternative an optimized irregular 4D constant modulus constellation is given as codeword(0)=[1.02794, 0.967254, 0.0444196, −0.076121],
codeword(1)=[0.208804, 0.820751, 1.07005, 0.371171],
codeword(2)=[−0.406835, 1.29049, −0.152077, −0.382086],
codeword(3)=[0.102417, 0.713632, −1.21465, 0.0697183],
codeword(4)=[0.608192, 0.207482, −0.261452, 1.23235],
codeword(5)=[−0.174187, −0.64405, 0.480807, 1.15051],
codeword(6)=[−0.807031, 0.665983, −0.00607021, 0.951384],
codeword(7)=[−0.895231, −0.370208, −0.766306, 0.688682],
codeword(8)=[1.21753, −0.60942, 0.382287, 0.00860039],
codeword(9)=[0.227448, −0.689174, 1.19418, −0.217372],
codeword(10)=[−0.215596, −1.34803, −0.0553641, −0.365062],
codeword(11)=[0.555698, −0.87932, −0.94345, 0.167029],
codeword(12)=[0.612562, −0.11933, −0.527072, −1.15444],
codeword(13)=[0.0470608, 0.241796, 0.614318, −1.24977],
codeword(14)=[−1.1938, −0.110855, 0.693595, −0.285457],
codeword(15)=[−0.913185, −0.129016, −0.568366, −0.90907].

This code is approximately 0.5 dB better than DP-QPSK in terms of union bound although the minimum Euclidean distance is shorter.

Near-Constant Modulus Waveform with Filter Impulse Response

The constant modulus property of transmitting signals is important to decrease the nonlinear distortion over fiber cables. This suggests that the signal waveform after the transmit filter should be constant modulus, rather than signal constellation after receive filter at symbol timing. By considering the impulse response of the transmit filter, the performance of constant modulus waveform, not only at the symbol timing, can be improved while no redundancy is required at all, unlike conventional trellis shaping.

Figure 8:
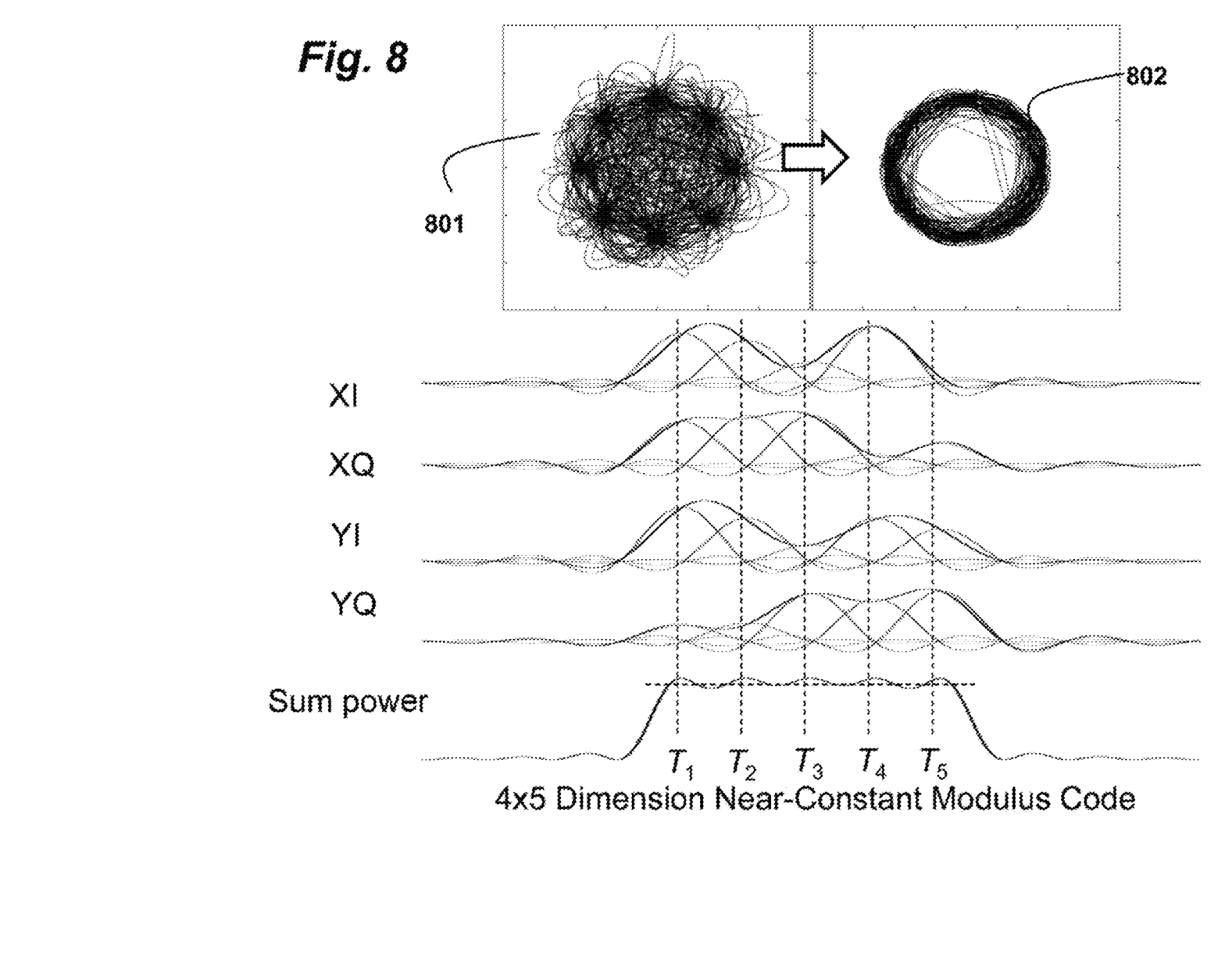
FIG. 8 is a schematic of a method for generating a constant modulus waveform with high-dimensional modulations and pulse impulse response of transmit filter according to embodiments of the invention.

Some embodiments of the invention are based on the realization of near-constant modulus waveform signals based on transmit filter impulse response. FIG. 8 shows a method of generating the constant modulus waveform with time-domain expanded high-dimensional modulations, i.e., 5 symbols of 4D carriers. Without this method, the signal waveform 801 becomes non-constant, even when we use PSK which is constant modulus at only symbol timing for Nyquist filter, because the transmit filter is typically not a Nyquist filter, and the transition of PSK is not well designed.

The embodiments generate a near-constant modulus waveform 802 by using the transmit filter impulse response. Given the transmit filter, which is a convolution of an electric filter, such as root-raised cosine filter, a response of a digital-to-analog converter, a response of an electro-optical driver, and an optical filter, such as a super-Gaussian filter, the method calculates all the possible waveforms for 4D carrier fields (XI, XQ, YI, YQ) over several symbols in time $(T_1, T_2, \ldots)$ within adjacent high-dimensional code blocks. The sum of waveform powers over this time window is adjusted by changing the constellation points, such that fluctuation of the power envelope are minimized over time and over all codewords so to be near-constant modulus signals. The constellation points are optimized by any combination of regular QAM/APSK or by meta-heuristic procedures with gradient search methods, in terms of some criteria under power fluctuation constraint.

For example, the optimization criterion becomes minimizing the Euclidean distance subject to the limited envelope fluctuation. For the case of the union bound criterion, the Lagrange multiplier method simplifies the objective function as $$\min p_{union} + \lambda \epsilon_{env}$$

$$\epsilon_{env} = \frac{\mathbb{E}[\|w_m - \mu 1\|^2]}{\mu^2} = \frac{NM \sum_m \|w_m\|^2}{(\sum_m 1^T w_m)^2} - 1$$

where $p_{union}$ is the union bound, lambda is Lagrange multiplier constant, $\epsilon_{env}$ is mean-square error of envelope, $w_m$ is the waveform of m-th codeword, N is the number of sample points, and M is the total cardinality. The waveform $w_m$ is calculated by the convolution of m-th codewords with an oversampled transmit filter. For the case of root-raised-cosine filter, the impulse response is expressed as $$h(t) = \frac{\sin(\pi t(1-\beta)) + 4\beta t\cos(\pi t(1+\beta))}{\pi t(1 - (4\beta t)^2)}$$

where beta is a roll-off factor.

For 2×4D constellations of DP-BPSK alternative, an optimal code to have minimum union bound at 4.5 dB signal-to-noise ratio for 8-oversampled root-raised-cosine filter of 0.2 roll-off factor is given as codeword(0)=[−0.0397848, −0.304173, −0.67929, 1.15166, 1.08371, 0.748417, −0.602119, −0.145017],
codeword(1)=[−0.616147, −0.241839, −0.873087, 0.978189, −0.537574, −0.856556, 0.754385, 0.500971],
codeword(2)=[−0.231995, 0.252967, 0.826321, −0.959864, −0.907174, −0.868917, 0.663633, 0.509561],
codeword(3)=[−1.00487, −0.138183, 0.935827, 0.524888, −0.129914, 0.41734, −0.312385, 1.23743],
codeword(4)=[1.06152, −0.725662, 0.885593, 0.919474, −0.16669, −0.787976, −0.247217, 0.0841247],
codeword(5)=[0.77172, 0.230573, −0.011794, −0.160215, 1.12134, −0.495479, 0.383294, 1.29448],
codeword(6)=[0.287155, −0.989384, 0.248091, 0.0341007, 0.162579, 0.98933, 1.35261, 0.202938],
codeword(7)=[0.00199972, 1.01607, 0.821881, 0.845107, 0.560957, 0.0235378, 1.00491, −0.502841],
codeword(8)=[−0.973119, 0.785572, −0.965282, −0.900568, 0.197289, 0.751979, 0.286961, 0.0798922],
codeword(9)=[0.0683736, −0.936173, −0.950104, −0.886704, −0.602494, 0.163804, −0.854183, 0.55723], codeword(10)=[−0.096672, 1.14151, −0.274237, 0.0246579, −0.148662, −0.82523, −1.37599, −0.123872],
codeword(11)=[1.04793, 1.05828, −0.355611, 0.0930941, −0.860349, 0.825314, −0.187569, 0.436161],
codeword(12)=[0.430366, 0.0510524, 0.980033, −0.830371, 0.322751, 0.842856, −0.866114, −0.772963],
codeword(13)=[−0.629889, −0.248316, 0.213834, 0.323196, −1.19895, 0.399845, −0.346465, −1.29383],
codeword(14)=[0.969666, 0.0352477, −0.962988, −0.580544, 0.0643224, −0.507768, 0.35814, −1.18486],
codeword(15)=[−0.988496, −0.817811, 0.138199, −0.566111, 0.99281, −0.707393, −0.134555, −0.714352].

This code is approximately 1 dB better than DP-BPSK in terms of union bound, while the envelope mean-square error is 6 dB smaller.

The codebooks are not necessarily the same over all blocks, 'i.e., the code books for the codes can change over time. One embodiment uses an alternating codebook, where odd block and even block have different L-dimensional constellations similar to π/4-shift QPSK for 2-dimension case. The generalized phase Shift for L-dimensional space can be given by unitary rotation of size L, whose degree of freedom is L(L−1)/2. Any unitary rotation does not change the Euclidean distance and the bit error rate. For the 4D case, unitary rotation can be expressed by exponential map of skew-symmetry matrix as $$\exp\begin{bmatrix} 0 & \theta_1 & \theta_2 & \theta_3 \\ -\theta_1 & 0 & \theta_4 & \theta_5 \\ -\theta_2 & -\theta_4 & 0 & \theta_6 \\ -\theta_3 & -\theta_5 & -\theta_6 & 0 \end{bmatrix}$$

where θ can be optimized to minimize the envelope fluctuation at the time of constellation design. In addition, the symbol timing can by unsynchronized between XI, XQ, YI, YQ as offset QPSK and interleaved transmissions.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for generating a code for modulating signals transmitted for coherent optical communications, using a processor in connection with a memory, comprising:
providing codewords represented by points in a constellation of the code into the memory;
projecting the points in the constellation of the code onto a hyper-sphere by normalizing a sum of power over multiple dimensions to produce a multi-dimensional constellation, wherein the code is L-dimensional N-ary amplitude M-ary phase-shift keying including 4D-2A8PSK and 4D-2AQPSK, wherein amplitudes and phase offsets of the code are optimized, and wherein a sum of powers over L dimensions is constant for all codewords in the code;
identifying point pairs having a smallest distance in the multi-dimensional constellation that limits a performance of the code;
adjusting the point pairs in the multi-dimensional constellation to improve the performance of the code; and
iterating the identifying and the adjusting until convergence, wherein the steps are performed in the processor.

2. The method of claim 1, further comprising:
optimizing positions of the point pairs in the multi-dimensional constellation using a performance criterion, wherein the performance criterion maximizes a minimum Euclidean distance, minimizes a bit-error rate, minimizes a union bound, maximizes mutual information, maximizes a reach along a nonliner fiber, minimizes a required signal-to-noise ratio, maximizes a tolerance to phase noise, or minimizes fluctuation of a power envelope in a signal transition and combinations thereof.

3. The method of claim 1, wherein an initial code is selected from a group consisting of Gray-coded, dual-polarization M-ary phase-shift keying (DP-MPSK), M-ary quadrature-amplitude modulation (DP-MQAM), M-ary amplitude phase-shift keying (DP-MAPSK), and circular QAM formats, where M is an arbitrary positive integer depending on a specific target of data rates.

4. The method of claim 1, wherein the code uses a subspace of a unitary space-time block code of any number of dimensions to be constant modulus, using a discrete Fourier transform, an exponential mapping, a Cayley transform, a Reed-Muller operator, Grassmann packing, or cyclic rotations.

5. The method of claim 1, wherein the constellation is irregular adjusted by a meta-heuristic optimization procedure, nonlinear programming, or a gradient search method.

6. The method of claim 1, further comprising:
optimizing the multi-dimensional constellation while taking a transmit filter impulse response into account to generate near-constant modulus waveform over multiple symbols even for symbol transitions, by determining a power envelope for each codeword of adjacent blocks in the code.

7. The method of claim 6, wherein codebook for the code changes over time using unitary rotation to minimize fluctuations of the power envelope.

8. The method of claim 6, wherein an impulse response of a transmit filter is a convolution of all components affecting input to a fiber, including an electrical filter, such as root-raised-cosine filter, a response of an analog-to-digital converter, a response of an electro-optic driver or an optical filter, such as super-Gaussian filter.

9. The method of claim 6, wherein a symbol timing of 4D carrier fields are synchronized.

10. The method of claim 6, wherein a symbol timing of 4D carrier fields is unsynchronized and timing offsets between in-phase, quadrature, x-polarization and y-polarization are optimized to achieve near-constant modulus waveform.

11. The method of claim 1, wherein the multiple dimensions include an in-phase component, a quadrature component, x-polarization, y-polarization, multiple symbols in a time domain, multiple channels in super-channel transmissions, multiple wavelengths in wavelength-division multiplexing, multiple modes in mode-division multiplexing, multiple cores in space-division multiplexing, multiple fibers, and combinations thereof.

12. The method of claim 1, wherein the steps are performed offline.

13. A computer-implemented method for generating a code for modulating signals transmitted for coherent optical communications, using a processor in connection with a memory, comprising:
- providing codewords represented by points in a constellation of the code into the memory;
- projecting the points in the constellation of the code onto a hyper-sphere by normalizing a sum of power over multiple dimensions to produce a multi-dimensional constellation, wherein the code uses a subspace of a unitary space-time block code of any number of dimensions to be constant modulus, using a discrete Fourier transform, an exponential mapping, a Cayley transform, a Reed-Muller operator, Grassmann packing, or cyclic rotations;
- identifying point pairs having a smallest distance in the multi-dimensional constellation that limits a performance of the code;
- adjusting the point pairs in the multi-dimensional constellation points to improve the performance of the code; and
- iterating the identifying and the adjusting until convergence, wherein the steps are performed in the processor.

14. A computer-implemented method of generating a code for modulating signals transmitted for coherent optical communications, using a processor in connection with a memory, comprising:
- providing codewords represented by points in a constellation of the code into the memory;
- projecting the points in the constellation of the code onto a hyper-sphere by normalizing a sum of power over multiple dimensions to produce a multi-dimensional constellation;
- identifying point pairs having a smallest distance in the multi-dimensional constellation that limits a performance of the code;
- adjusting the point pairs in the multi-dimensional constellation points to improve the performance of the code;
- iterating the identifying and the adjusting until convergence; and
- optimizing the multi-dimensional constellation while taking a transmit filter impulse response into account to generate near-constant modulus waveform over multiple symbols even for symbol transitions, by determining a power envelope for each codeword of adjacent blocks in the code, wherein the steps are performed in the processor.

* * * * *